US010402943B2

(12) United States Patent
Yang et al.

(10) Patent No.: US 10,402,943 B2
(45) Date of Patent: Sep. 3, 2019

(54) IMAGE ENHANCEMENT DEVICE AND METHOD FOR CONVOLUTIONAL NETWORK APPARATUS

(71) Applicant: HTC Corporation, Taoyuan (TW)

(72) Inventors: Hung-Yi Yang, Taoyuan (TW); Cheng-Hsien Lin, Taoyuan (TW); Po-Chuan Cho, Taoyuan (TW)

(73) Assignee: HTC Corporation, Taoyuan (TW)

( * ) Notice: Subject to any disclaimer, the term of this patent is extended or adjusted under 35 U.S.C. 154(b) by 154 days.

(21) Appl. No.: 15/716,490

(22) Filed: Sep. 26, 2017

(65) Prior Publication Data

US 2018/0114294 A1    Apr. 26, 2018

Related U.S. Application Data

(60) Provisional application No. 62/410,407, filed on Oct. 20, 2016.

(51) Int. Cl.
*G06T 3/40* (2006.01)
*G06T 7/90* (2017.01)
*G06T 5/00* (2006.01)

(52) U.S. Cl.
CPC ............ *G06T 3/4046* (2013.01); *G06T 5/003* (2013.01); *G06T 7/90* (2017.01); *G06T 2207/10024* (2013.01); *G06T 2207/20016* (2013.01); *G06T 2207/20081* (2013.01); *G06T 2207/20084* (2013.01)

(58) Field of Classification Search
CPC ......... G06T 3/4046; G06T 7/90; G06T 5/003; G06T 2207/10024; G06T 2207/20016; G06T 2207/20081; G06T 2207/20084

USPC ......................................................... 382/298
See application file for complete search history.

(56) References Cited

U.S. PATENT DOCUMENTS

| 9,014,470 | B2 * | 4/2015 | Shechtman ............... G06T 7/33 |
| | | | 382/167 |
| 9,336,582 | B1 | 5/2016 | Barron |
| 9,984,325 | B1 * | 5/2018 | Kim ..................... G06K 9/6274 |
| 2016/0019422 | A1 | 1/2016 | Savvides et al. |
| 2016/0350900 | A1 * | 12/2016 | Barron ..................... G06T 5/40 |
| 2017/0104976 | A1 * | 4/2017 | Bishop ................. H04N 13/257 |

(Continued)

FOREIGN PATENT DOCUMENTS

| CN | 103716630 A | 4/2014 |
| TW | 201209755 A | 3/2012 |

OTHER PUBLICATIONS

Corresponding Taiwanese office action dated Feb. 6, 2018.

*Primary Examiner* — Jonathan S Lee
(74) *Attorney, Agent, or Firm* — CKC & Partners Co., LLC

(57) ABSTRACT

An image enhancement device that includes a down-sampling module, correction modules and an up-sampling module is provided. The down-sampling module down-samples an input image to generate down-sampled images having different down-sampled resolutions. Each of the correction modules performs correction on one of the down-sampled images according to a correction model based on at least one correction parameter to generate one of corrected images. The up-sampling module up-samples the corrected images to generate up-sampled images, wherein each of the up-sampled images is of a same up-sampled resolution. The concatenating module concatenates the up-sampled images into an output image.

19 Claims, 3 Drawing Sheets

(56) References Cited

U.S. PATENT DOCUMENTS

2018/0061059 A1\* 3/2018 Xu .................... G06N 3/0454
2018/0276825 A1\* 9/2018 Dai .................... G06T 7/11

\* cited by examiner

IMAGE ENHANCEMENT DEVICE AND METHOD FOR CONVOLUTIONAL NETWORK APPARATUS

RELATED APPLICATIONS

This application claims priority to U.S. provisional Application Ser. No. 62/410,407 filed Oct. 20, 2016, which is herein incorporated by reference.

BACKGROUND

Field of Invention

The present disclosure relates to an image-processing technology. More particularly, the present disclosure relates to an image enhancement device and image enhancement method for a convolutional network apparatus.

Description of Related Art

Image segmentation is a challenging problem in computer graphics, particularly with respect to digitally separating a desired object (foreground) from a background of the digital image. Such separation is useful during digital editing of still images and video. In some approaches, deep learning model-based segmentation method is used to perform segmentation. However, the segmentation result of such a method is often affected by image scale, lighting and location changes.

Accordingly, what is needed is an image enhancement device and image enhancement method for a convolutional network apparatus to address the issues mentioned above.

SUMMARY

An aspect of the present disclosure is to provide an image enhancement device that includes a down-sampling module, correction modules and an up-sampling module is provided. The down-sampling module is configured to down-sample an input image to generate down-sampled images having different down-sampled resolutions. Each of the correction modules is coupled to the down-sampling module, and is configured to perform correction on one of the down-sampled images according to at least one correction model based on at least one correction parameter to generate one of corrected images. The up-sampling module is coupled to the correction modules, and is configured to up-sample the corrected images to generate up-sampled images, wherein each of the up-sampled images is of a same up-sampled resolution. The concatenating module is coupled to the up-sampling module, and concatenates the up-sampled images into an output image.

Another aspect of the present disclosure is to provide a convolutional network apparatus that includes operation layers and an image enhancement device. The operation layers are operated in series and are configured to perform convolution on an under-processed input image to generate a processed output image. The image enhancement device includes a down-sampling module, correction modules and an up-sampling module is provided. The down-sampling module is configured to down-sample an input image to generate down-sampled images having different down-sampled resolutions, wherein the input image is either received from a first one of the operation layers or is either the under-processed input image. Each of the correction modules is coupled to the down-sampling module, and is configured to perform correction on one of the down-sampled images according to at least one correction model based on at least one correction parameter to generate one of corrected images. The up-sampling module is coupled to the correction modules, and is configured to up-sample the corrected images to generate up-sampled images, wherein each of the up-sampled images is of a same up-sampled resolution. The concatenating module is coupled to the up-sampling module, and concatenates the up-sampled images into an output image.

Yet another aspect of the present disclosure is to provide an image enhancement method used in an image enhancement device that includes the steps outlined below. An input image is down-sampled to generate a plurality of down-sampled images. Correction is performed on the down-sampled images each according to at least one correction model based on at least one correction parameter to generate a plurality of corrected images. The corrected images are up-sampled to generate a plurality of up-sampled images, wherein each of the up-sampled images is of a same resolution. The up-sampled images are concatenated into an output image.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
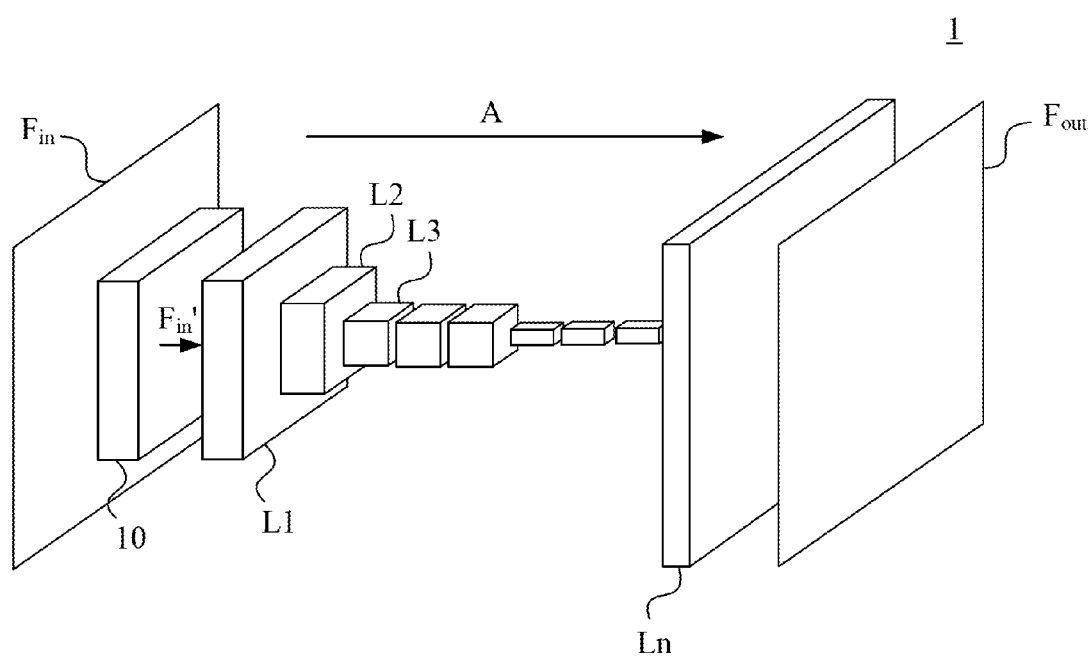
FIG. 1 is a diagram illustrating a convolutional network apparatus in an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Reference is made to FIG. 1. FIG. 1 is a diagram illustrating a convolutional network apparatus 1 in an embodiment of the present disclosure.

The convolutional network apparatus 1 includes operation layers L1, L2, L3, . . . , Ln and an image enhancement device 10. The operation layers L1, L2, L3, . . . , Ln may include such as, but not limited to a convolution layer, a pooling layer, a dropout layer, a batch normalization layer, a dilation convolution layer, an active function layer or a combination thereof.

In an embodiment, the convolutional network apparatus 1 is a fully convolutional neural network for performing image segmentation. The operation layers L1, L2, L3, . . . , Ln included therein are operated in series along the direction A and are configured to perform convolution on an under-processed input image $F_{in}$ to generate a processed output image $F_{out}$. The processed output image $F_{out}$ may include such as, but not limited to at least one segmented feature (not illustrated).

More specifically, as illustrated in FIG. 1, each of the operation layers L1, L2, L3, . . . , Ln is illustrated as a cubic and is operated to perform convolution on an input image processed by a previous operation layer to generate an output image to a subsequent operation layer, except that the first operation layer L1 performs convolution on the under-processed input image $F_{in}$ and the last operation layer Ln generates the processed output image $F_{out}$.

For example, the operation layer L2 performs convolution on an image (not illustrated) processed by the operation layer L1 and generates a processed image (not illustrated) to the operation layer L3.

The image enhancement device 10 is disposed either before the operation layer L1 or between any two of the operation layers, e.g. the operation layers L2 and L3.

In the present embodiment, the image enhancement device 10 is disposed before the operation layer L1 the image enhancement device 10 is configured to perform image enhancement on the under-processed input image $F_{in}$ such that the operation layer L1 substantially receives the enhanced result, e.g. an enhanced image $F_{in}'$ illustrated in FIG. 1.

As a result, the operation layers disposed after the image enhancement device 10 can perform convolution by using an enhanced image. The convolutional network apparatus 1 can accomplish a better segmentation result.

It is appreciated that the embodiment of the image enhancement device 10 disposed before the operation layer L1 is merely an example. In another embodiment, the image enhancement device 10 can be disposed between such as, but not limited to the operation layers L2 and L3 to perform image enhancement on the image finished processing by the operation layer L2 such that the operation layer L3 substantially receives the enhanced result. Moreover, in an embodiment, the convolutional network apparatus 1 may include more than one image enhancement devices each disposed between different pair of operation layers.

The detail of the operation of the image enhancement device 10 is described in the following paragraphs.

Figure 2:
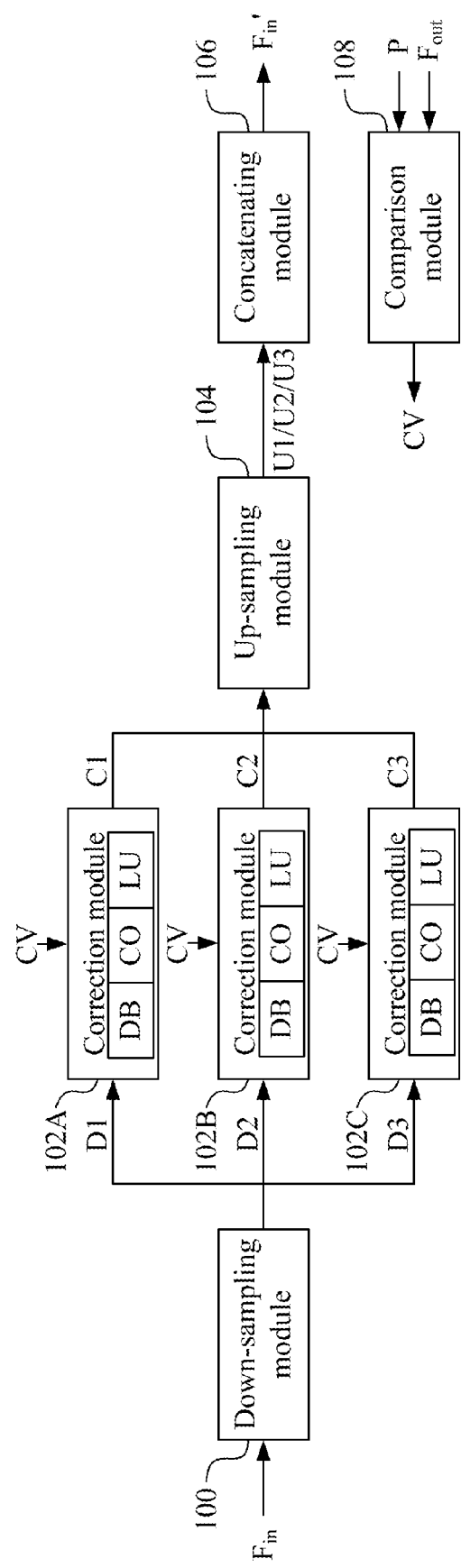
FIG. 2 is a block diagram of the image enhancement device in an embodiment of the present invention.

Reference is now made to FIG. 2. FIG. 2 is a block diagram of the image enhancement device 10 in an embodiment of the present invention. The image enhancement device 10 includes a down-sampling module 100, correction modules 102A, 102B and 102C, an up-sampling module 104, a concatenating module 106 and a comparison module 108.

In some embodiments, the down-sampling module 100, the correction modules 102A, 102B and 102C, the up-sampling module 104, the concatenating module 106 and the comparison module 108 can be realized by, for example, one or more processors, such as central processors and/or microprocessors, but are not limited in this regard.

In some embodiments, the down-sampling module 100, the correction modules 102A, 102B and 102C, the up-sampling module 104, the concatenating module 106 and the comparison module 108 include one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

In some embodiments, the down-sampling module 100, the correction modules 102A, 102B and 102C, the up-sampling module 104, the concatenating module 106 and the comparison module 108 may run or execute various software programs and/or sets of instructions stored in memory (not illustrated) to perform various functions for the image enhancement device 10 and to process data.

The down-sampling module 100 is configured to down-sample an input image, such as but not limited to the under-processed input image $F_{in}$, to generate down-sampled images D1, D2 and D3 having different down-sampled resolutions.

For example, when the under-processed input image $F_{in}$ has a resolution of 200×200, the resolutions of the down-sampled images D1, D2 and D3 can be such as, but not limited to 200×200 (down-sampled by 1), 100×100 (down-sampled by ½) and 50×50 (down-sampled by ¼) respectively.

Each of the correction modules 102A, 102B and 102C is coupled to the down-sampling module 100, and is configured to perform correction on one of the down-sampled images D1, D2 and D3 according to at least one correction model based on at least one correction parameter to generate one of corrected images C1, C2 and C3. In different embodiments, the correction model can be any appropriate mathematics model used to perform image correction.

In the present embodiment, each of the correction modules 102A, 102B and 102C includes a blur correction model BL, a color correction model CO and a luminous correction model LU.

The blur correction model BL is configured to perform blur correction on an image, e.g. the under-processed input image $F_{in}$, according to at least one correction parameter related to the blur correction operation. The blur region in the image processed by the blur correction model BL would become clear when the at least one correction parameter is well-selected.

The color correction model CO is configured to perform color correction on an image, e.g. the under-processed input image $F_{in}$, according to at least one correction parameter related to the color correction operation. The region having false colors in the image processed by the color correction model CO would be corrected when the at least one correction parameter is well-selected.

The luminous correction model LU is configured to perform luminous correction on an image, e.g. the under-processed input image $F_{in}$, according to at least one correction parameter related to the luminous correction operation. The region having low brightness in the image processed by the luminous correction model LU would become brighter when the at least one correction parameter is well-selected.

The up-sampling module 104 is coupled to the correction modules 102A, 102B and 102C, and is configured to up-sample the corrected images C1, C2 and C3 to generate up-sampled images U1, U2 and U3, wherein each of the up-sampled images U1, U2 and U3 is of a same up-sampled resolution. In an embodiment, when the under-processed input image $F_{in}$ has the resolution of 200×200, each of the up-sampled images U1, U2 and U3 also has the resolution of 200×200.

The concatenating module 106 is coupled to the up-sampling module 104, and is configured to concatenate the up-sampled images U1, U2 and U3 into an output image. In an embodiment, the output image generated by the concatenating module 106 is the image $F_{in}'$.

The comparison module 108 is configured to calculate a cost value CV based on a cost function according to a difference between a processed image processed by at least one operation layer subsequent to the image enhancement device 10 and a predetermined image P corresponding to the under-processed input image $F_{in}$.

In an embodiment, the processed image is the processed output image $F_{out}$. In other embodiments, the processed image can be the image processed by either the operation layer L1, L2, L3, . . . or Ln.

In an embodiment, the comparison module 108 may calculate the cost value CV based on the cost function according to a difference between the output image $F_{out}$ and the predetermined image P. In practice, the output image is such as, but not limited to a feature map, and the predetermined image P is such as, but not limited to a Ground Truth.

In an embodiment, the predetermined image P is different when different images processed by one of the operation layer L1, L2, L3, . . . or Ln is used as the processed image.

In an embodiment, under a training mode, each of the correction modules 102A, 102B and 102C is further configured to receive the cost value CV and adjust the correction parameter accordingly so as to decrease the cost value CV.

For example, the under-processed input image $F_{in}$ can be a blurred version of the predetermined image P and can be processed by the down-sampling module 100, the correction modules 102A, 102B and 102C, the up-sampling module 104 and the concatenating module 106 as described above. The comparison module 108 compares the predetermined image P and the output image, i.e. the image $F_{in}'$, to generate at least one cost value CV such that each of the correction modules 102A, 102B and 102C adjusts the correction parameter accordingly.

In an embodiment, under the training mode, the correction modules 102A, 102B and 102C determine whether the cost value CV is smaller than a predetermined threshold value such that when the cost value CV is smaller than the predetermined threshold value, the image enhancement device 1 is operated in the operation mode and each of the correction modules 102A, 102B and 102C ceases to adjust the correction parameter.

More specifically, in an embodiment, the under-processed input image $F_{in}$ can be processed by the modules mentioned above again, in which each of the correction modules 102A, 102B and 102C uses the adjusted correction parameter to perform correction. The comparison module 108 compares the predetermined image P and the newly generated output image to generate the cost value CV.

When the cost value CV is still not smaller than a predetermined threshold value, each of the correction modules 102A, 102B and 102C keeps adjusting the correction parameter and the procedure described above is repeated until the cost value CV is smaller than the predetermined threshold value.

In an embodiment, under an operation mode, each of the correction modules 102A, 102B and 102C ceases to adjust the correction parameter. As a result, each of the correction modules 102A, 102B and 102C simply uses the correction parameter to perform correction such that the concatenating module 106 generates the image $F_{in}'$ based on the correction performed according to the correction parameter.

As a result, the image enhancement device 10 in the present invention is able to perform image enhancement based on the learning result to perform such as, but not limited blur, color and luminous correction. Moreover, the convolutional network apparatus 1 in the present invention is able to use the enhanced image to perform convolution to obtain a better image segmentation result.

It is appreciated that in different embodiments, the operation layers of the convolutional network apparatus 1 and the modules in the image enhancement device 10 can be implemented by either hardware components or software modules.

It is also appreciated that in another embodiment, a validation accuracy is calculated to determine whether the training mode is finished. In an embodiment, the validation accuracy is calculated based on such as, but not limited to a training set and a validation set of input images. When the validation accuracy is higher than a predetermined value, the training mode is finished and the image enhancement device 10 is further operated in the operation mode. Further, in other embodiments, a multiple of indexes, such as, but not limited to the cost value CV, the validation accuracy, a training set error, a validation error or a combination thereof can be used to determine whether the training mode is finished.

Figure 3:
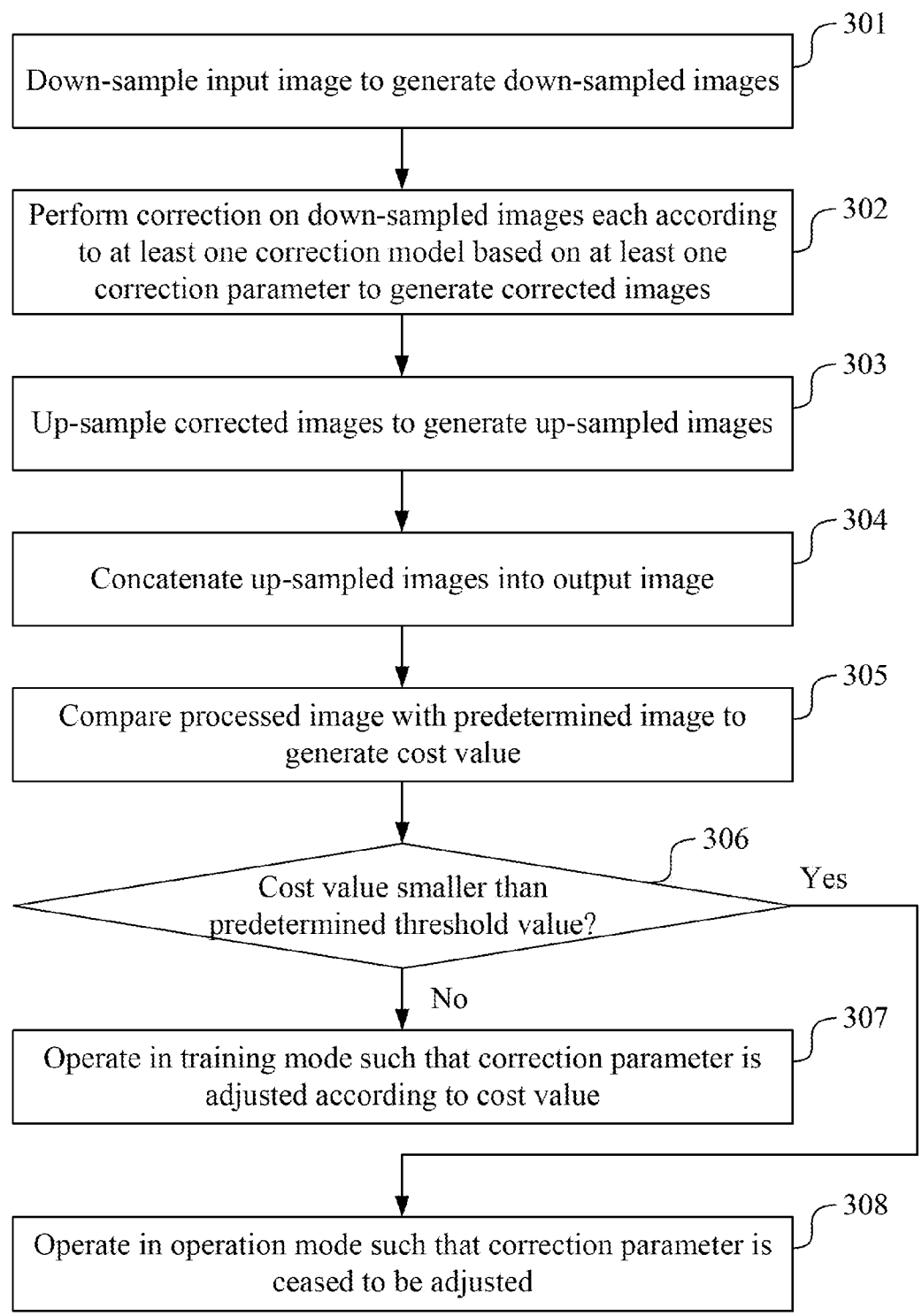
FIG. 3 is an image enhancement method in an embodiment of the present invention.

FIG. 3 is an image enhancement method 300 in an embodiment of the present invention. The image enhancement method 300 can be used in the image enhancement device 10 illustrated in FIG. 2, or be implemented by using other hardware components such as a database, a common processor, a computer, a server, other unique hardware devices that have a specific logic circuit or an equipment having a specific function, e.g. a unique hardware integrated by a computer program and a processor or a chip.

More specifically, the image enhancement method 300 is implemented by using a computer program having computer readable instructions to control the modules in the image enhancement device 10. The instructions can be stored in a memory, in which the memory can be a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this disclosure pertains.

The detail of the image enhancement method 300 illustrated in FIG. 3 is described in accompany with FIG. 2. The image enhancement method 300 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 301, an input image, e.g. the under-processed input image $F_{in}$, is down-sampled by the down-sampling module 100 to generate the down-sampled images D1, D2 and D3.

In step 302, correction is performed on the down-sampled images D1, D2 and D3 each according to at least one correction model by the correction modules 102A, 102B and 102C based on at least one correction parameter to generate the corrected images C1, C2 and C3.

In step 303, the corrected images C1, C2 and C3 are up-sampled by the up-sampling module 104 to generate the up-sampled images U1, U2 and U3, wherein each of the up-sampled images U1, U2 and U3 is of a same resolution.

In step 304, the up-sampled images U1, U2 and U3 are concatenated into an output image, e.g. the image $F_{in}'$, by the concatenating module 106.

In step 305, the output image, e.g. the image $F_{out}$, is compared with a predetermined image P corresponding to the under-processed input image $F_{in}$ by the comparison module 108 to generate at least one cost value CV.

In step 306, the correction modules 102A, 102B and 102C determine whether the cost value CV is smaller than a predetermined threshold value.

In step 307, when the cost value CV is not smaller than the predetermined threshold value, the image enhancement device 1 is operated in the training mode such that each of the correction modules 102A, 102B and 102C adjusts the correction parameter according to the cost value CV.

In step 308, when the cost value CV is smaller than the predetermined threshold value, the image enhancement device 1 is operated in the operation mode such that each of the correction modules 102A, 102B and 102C ceases to adjust the correction parameter.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image enhancement device comprising:
   a down-sampling module configured to down-sample an input image to generate a plurality of down-sampled images having different down-sampled resolutions;
   a plurality of correction modules coupled to the down-sampling module, each configured to perform correction on one of the down-sampled images according to at least one correction model based on at least one correction parameter to generate one of a plurality of corrected images;
   an up-sampling module coupled to the correction modules, configured to up-sample the corrected images to generate a plurality of up-sampled images, wherein each of the up-sampled images is of a same up-sampled resolution; and
   a concatenating module coupled to the up-sampling module, configured to concatenate the up-sampled images into an output image.

2. The image enhancement device of claim 1, wherein the correction model includes a blur correction model, a color correction model or a luminous correction model or a combination thereof.

3. The image enhancement device of claim 1, further comprising:
   a comparison module coupled to the correction modules, configured to calculate a cost value based on a cost function according to a difference between the output image and a predetermined image corresponding to the input image or between a processed image processed by at least one operation layer subsequent to the image enhancement device and the predetermined image;
   wherein under a training mode, each of the correction modules is further configured to adjust the correction parameter according to the cost value so as to decrease the cost value; and
   under an operation mode, each of the correction modules ceases to adjust the correction parameter.

4. The image enhancement device of claim 3, wherein under the training mode, the correction modules determine whether the cost value is smaller than a predetermined threshold value such that when the cost value is smaller than the predetermined threshold value, the image enhancement device is operated in the operation mode and each of the correction modules ceases to adjust the correction parameter.

5. The image enhancement device of claim 1, wherein the concatenating module transmits the output image to a first one of a plurality of operation layers of a convolutional network apparatus.

6. The image enhancement device of claim 5, wherein the concatenating module receives the input image from a second one of the operation layers of the convolutional network apparatus prior to the first one of the operation layers.

7. The image enhancement device of claim 5, wherein the concatenating module receives an under-processed input image of the convolutional network apparatus as the input image.

8. A convolutional network apparatus comprising:
a plurality of operation layers operated in series and configured to perform convolution on an under-processed input image to generate a processed output image; and
an image enhancement device comprising:
    a down-sampling module configured to down-sample an input image to generate a plurality of down-sampled images having different down-sampled resolutions, wherein the input image is either received from a first one of the operation layers or is either the under-processed input image;
    a plurality of correction modules coupled to the down-sampling module, each configured to perform correction on one of the down-sampled images according to at least one correction model based on at least one correction parameter to generate one of a plurality of corrected images;
    an up-sampling module coupled to the correction modules, configured to up-sample the corrected images to generate a plurality of up-sampled images, wherein each of the up-sampled images is of a same up-sampled resolution; and
    a concatenating module coupled to the up-sampling module, configured to concatenate the up-sampled images into an output image, wherein the output image is transmitted to a second one of the operation layers.

9. The convolutional network apparatus of claim 8, wherein the correction model includes a blur correction model, a color correction model or a luminous correction model or a combination thereof.

10. The convolutional network apparatus of claim 8, wherein the image enhancement device further comprises:
a comparison module coupled to the correction modules, configured to calculate a cost value based on a cost function according to a difference between the output image with a predetermined image corresponding to the input image or between a processed image processed by at least one of the operation layers subsequent to the image enhancement device and the predetermined image;
wherein under a training mode, each of the correction modules is further configured to adjust the correction parameter according to the cost value so as to decrease the cost value; and
under an operation mode, each of the correction modules ceases to adjust the correction parameter.

11. The convolutional network apparatus of claim 10, wherein under the training mode, the correction modules determine whether the cost value is smaller than a predetermined threshold value such that when the cost value is smaller than the predetermined threshold value, the image enhancement device is operated in the operation mode and each of the correction modules ceases to adjust the correction parameter.

12. The convolutional network apparatus of claim 8, wherein the processed output image comprises at least one segmented feature.

13. An image enhancement method used in an image enhancement device comprising:
down-sampling an input image to generate a plurality of down-sampled images;
performing correction on the down-sampled images each according to at least one correction model based on at least one correction parameter to generate a plurality of corrected images;
up-sampling the corrected images to generate a plurality of up-sampled images, wherein each of the up-sampled images is of a same resolution; and
concatenating the up-sampled images into an output image.

14. The image enhancement method of claim 13, wherein the correction model includes a blur correction model, a color correction model or a luminous correction model or a combination thereof.

15. The image enhancement method of claim 13, further comprising:
a comparison module configured to calculate a cost value based on a cost function according to a difference between the output image and a predetermined image corresponding to the input image or between a processed image processed by at least one operation layer subsequent to the image enhancement device and the predetermined image;
calculating a cost value based on a cost function according to a difference between the output image and a predetermined image corresponding to the input image or between a processed image processed by at least one operation layer subsequent to the image enhancement device and the predetermined image;
under a training mode, adjusting the correction parameter according to the cost value so as to decrease the cost value; and
under an operation mode, ceasing to adjust the correction parameter.

16. The image enhancement method of claim 15, wherein under the training mode, the image enhancement method further comprises:
determining whether the cost value is smaller than a predetermined threshold value; and
when the cost value is smaller than the predetermined threshold value, operating the image enhancement device in the operation mode and ceasing to adjust the correction parameter.

17. The image enhancement method of claim 13, further comprising:
transmitting the output image to a first one of a plurality of operation layers of a convolutional network apparatus.

18. The image enhancement method of claim 17, further comprising:
receiving the input image from a second one of the operation layers of the convolutional network apparatus prior to the first one of the operation layers.

19. The image enhancement method of claim 17, further comprising:
receiving an under-processed input image of the convolutional network apparatus as the input image.

* * * * *